Sept. 3, 1940.   H. J. HORN   2,213,861
VEHICLE WHEEL
Filed Nov. 12, 1937
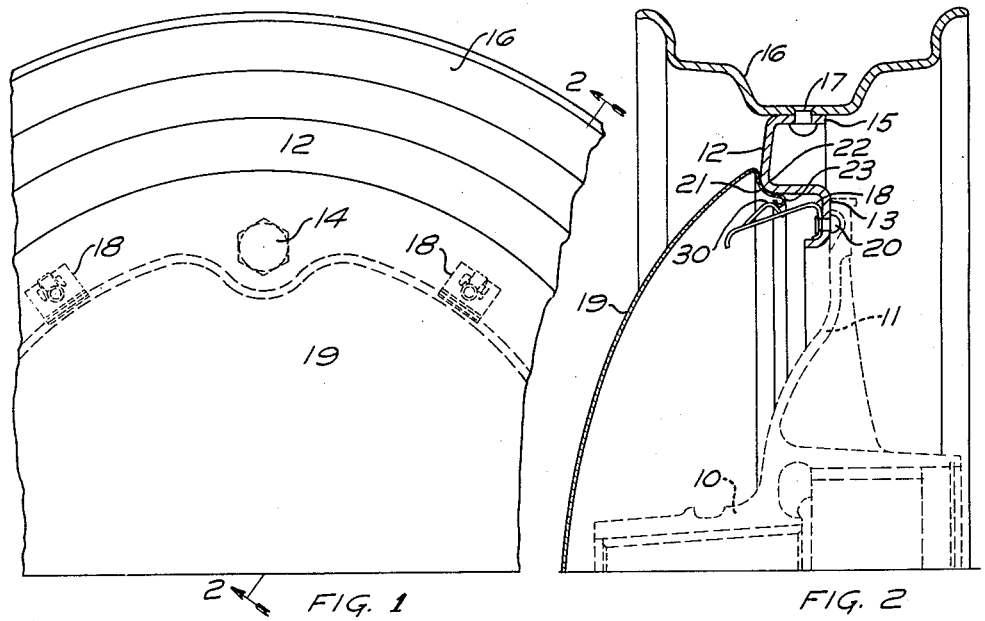
FIG. 1   FIG. 2
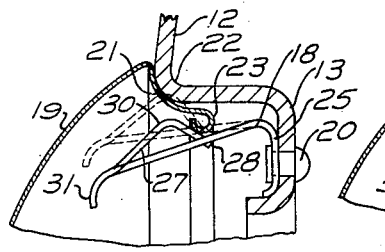   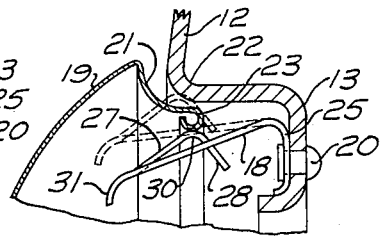   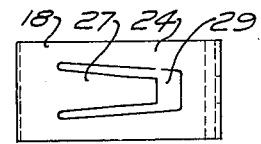
FIG. 6   FIG. 5   FIG. 3
FIG. 4.
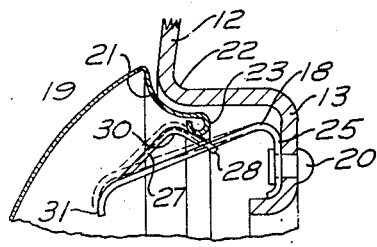
FIG. 7
INVENTOR.
HARRY J. HORN
BY
Carroll R. Taber
ATTORNEY.

Patented Sept. 3, 1940

2,213,861

UNITED STATES PATENT OFFICE 2,213,861

VEHICLE WHEEL

Harry J. Horn, Lansing, Mich., assignor to Motor Wheel Corporation, Lansing, Mich., a corporation of Michigan Application November 12, 1937, Serial No. 174,134

6 Claims. (Cl. 301—37)

This invention relates to vehicle wheels, and more particularly to the means for securing covers to such wheels.

In conventional vehicle wheels a cover is provided in order to improve the appearance of the outer portion thereof, and various means have been devised to secure the cover to the wheel. A great many of these prior devices have had various disadvantages, and it is an object of this invention to provide an improved attaching clip which will overcome these objections.

It is desirable to provide a clip which is relatively flexible and resilient but so designed that the cover will be easily attached to the wheel without requiring undue pressure to force the cover into place and yet prevent accidental removal of said cover. It is also important that the clip be relatively short in a direction axial of the wheel in order that it will not interfere with the cover plate when it is placed in position. Besides the foregoing desirable features, it is essential in present day production to manufacture the attaching clip as economically as possible.

The clip herein shown and presently to be described is simple and economically manufactured. It is resilient and yet it allows the cover to be easily placed on the wheel but makes its removal rather difficult.

In the drawing:

Figure 1 is a fragmentary front elevation of a vehicle wheel showing the invention in place thereon;

Figure 2 is a cross-sectional view taken on substantially the line 2—2 of Figure 1;

Figure 3 is a plan view showing the improved clip in full size;

Figure 4 is a side elevational view of the clip shown in Figure 3;

Figure 5 is a fragmentary cross-sectional view similar to Figure 2 but showing the position of the clip as the cover is being forced on the wheel;

Figure 6 is a view similar to Figure 5 but showing the cover in place on the wheel; and Figure 7 is another fragmentary cross-sectional view showing the position of the clip and cover when the cover is being removed from the wheel.

Referring now more particularly to Figures 1 and 2, a portion of a wheel is shown which includes a hub 10 having a radial flange 11. Secured to the outer face of the flange 11 near its periphery is a wheel body 12. The wheel body is provided with an annular channel portion 13 recessed axially inwardly from the outer face of the wheel body. This channel 13 is provided with a plurality of apertures which receive any conventional fastening means such as cap screws 14 for removably securing the wheel body 12 to the flange 11.

The outer periphery of the wheel body 12 is flanged axially at 15 to form a seat for a rim 16 of any conventional type. The rim 16 is permanently attached to the rim seat 15 by a plurality of rivets 17.

Secured at intervals about the base of the channel 13 are resilient clips 18 for attaching the cover plate 19 to the wheel. Clips 18 are secured to the base of the channel 13 by rivets 20.

The cover 19 is formed at its outer periphery with a reversely curved portion 21 which seats against the shoulder 22 on the wheel body when the cover is in place on the wheel. A bead 23 formed by rolling the edge of the cover is provided for snapping over the hump 30 in the clip 18.

The clip is shown full size in Figures 3 and 4. It consists of a relatively flat body portion 24 bent downwardly at one end as at 25 to form an attaching portion for attachment to the wheel body. This attaching portion 25 is formed with an aperture 26 for the reception of rivets 20. It will be noted that the angle between the body portion 24 and the attaching portion 25 of the clip is somewhat less than 90 degrees.

A tongue 27 is struck from the body portion 24 and bent upwardly at an angle away from the said body portion. The tongue 27 is attached to the body portion 24 adjacent the outer end of said body portion. The inner free end 28 of the tongue 27 is bent reversely downwardly so that its free end is located in or adjacent the aperture 29 formed when the tongue is struck from the body portion 24. By bending the end 29 downwardly a hump 30 is formed between the ends of the tongue 27 for a purpose which will presently appear.

It will be noted that the tongue 27 is tapered uniformly from its outer end to its free end, and the aperture 29 from which the tongue is struck is also tapered from its outer end toward the attaching end of the body 24. By so tapering both the tongue 27 and the aperture 29, both the tongue and the body are made more flexible adjacent their free ends. Consequently, the flexing of the clip when it is in use will be substantially uniform from one end to the other.

The free end 31 of the body 24 is bent downwardly in order that it will not interfere with the cover, and also will tend to prevent injury to the operator's hands or clothing when placing the cover on the wheel.

As before stated, the clip 18 is so formed that the cover goes on easily but comes off hard. In order to more clearly demonstrate this effect, Figures 5, 6 and 7 have been shown in the drawing. Figure 5 shows the position of the clip when the cover plate is being pushed onto the wheel. The normal or free position of the clip is shown in dotted lines, while the distorted position as the clip is forced on is shown in full lines. It will be noted that the body 24 has been forced downward and the tongue 27 has also been compressed toward the body 24. The end 28 of tongue 27 is shown as extending a substantial distance through the aperture 29.

Figure 6 shows the position of the clip when the cover is in place on the wheel. As in Figure 5, the distorted position is shown in full lines and the normal or free position is shown in dotted lines. It will be noted from this figure that the tongue 27 has returned to substantially its normal position relative to the body 24, but the body 24 is still bent somewhat downwardly from its normal position. As it is still stressed when the cover is in position, it will require considerably more force to remove the cover than it would if the clip had completely returned to its normal position.

Figure 7 shows the position of the clip when the cover is being removed from the wheel. The distorted position is shown in full lines, but in this case the dotted line position corresponds with the full line position of Figure 6, or in other words, the position of clip when the cover is in place on the wheel. It will be noted that the cover has just been started from its position in Figure 6, and the tongue 27 has not been moved appreciably from that position. The body 24, however, has been forced downwardly somewhat to the position shown in full lines in Figure 5.

From the foregoing reference to Figures 5, 6 and 7, it will be understood that when the cover is installed the tongue and clip are deflected in the same direction and the effective length of the clip is the combined lengths of the clip body and tongue. When the cover is removed, the tongue and clip are initially deflected in opposite directions and the effective length of the clip is only the length of the clip body. These differences are primarily responsible for the fact that the cover is more easily installed than removed.

It will be readily apparent from the foregoing that the clip herein described fulfils all the requirements outlined at the beginning of this specification. It is extremely flexible, it is relatively short in overall length, and it allows the cover to be forced on easily but prevents accidental removal. Also, it can be readily and economically fashioned from a relatively small piece of metal.

It will be apparent that the invention herein disclosed is adapted to a variety of forms, and consequently, I desire to be limited only by the scope of the appended claims.

I claim:

1. In a vehicle wheel, the combination of a cover retaining clip having a resilient body portion anchored at one end to the wheel and projecting freely away therefrom, a tongue struck from the body portion of the clip, said tongue being secured to said body portion adjacent the free end of the latter and extending freely away therefrom toward the anchored end of said body portion.

2. In a vehicle wheel, the combination of a cover retaining clip having a resilient body portion anchored at one end to the wheel and projecting freely away therefrom, a tongue struck from the body portion of the clip, said tongue being secured to said body portion adjacent the free end of the latter and extending freely away therefrom toward the anchored end of said body portion, said tongue being reversely curved intermediate its ends to provide a hump which is convex radially of the wheel.

3. The combination with a wheel of a cover retaining clip having a resilient body portion anchored at one end to the wheel and projecting freely away therefrom, a tongue struck from the body portion of the clip leaving an aperture in said body portion, said tongue being secured to said body portion adjacent the free end of the latter and extending freely away therefrom toward the anchored end of said body portion, the free end of said tongue being adapted to extend into said aperture.

4. The combination with a wheel of a cover retaining clip having a resilient body portion anchored at one end to the wheel and projecting freely away therefrom, a tongue struck from the body portion of the clip, said tongue being secured to said body portion adjacent the free end of the latter and extending freely away therefrom toward the anchored end of said body portion, said body portion and tongue being so formed that they may flex uniformly throughout their lengths.

5. In combination, a wheel body, a cover therefor, and a plurality of cover retaining clips having body portions anchored at one end to the wheel body and projecting freely away therefrom, tongues struck from the body portions of the clips, said tongues being secured to the body portions adjacent the free ends thereof and extending freely toward the wheel body, said tongues being reversely curved intermediate their ends to form humps spaced from the body portion, said cover being adapted to be snapped over the humps on the tongues to secure it to the wheel body.

6. In combination, a wheel body, a cover therefor, and a plurality of cover retaining clips having body portions anchored to the wheel body and projecting freely away therefrom, tongues struck from the body portions of the clips, said tongues being secured to the body portions adjacent the free ends thereof and extending freely toward the wheel body, said tongues being reversely curved intermediate their ends to form humps which are convex in a radial direction with respect to said wheel and spaced from the body portion, said cover being adapted to be snapped over the humps on the tongues to secure it to the wheel body.

HARRY J. HORN.